US010875434B2

(12) United States Patent
Jeong

(10) Patent No.: US 10,875,434 B2
(45) Date of Patent: Dec. 29, 2020

(54) HEADREST MOVING DEVICE

(71) Applicant: WOOBO TECH CO., LTD., Pyeongtaek-si (KR)

(72) Inventor: Hae Il Jeong, Incheon (KR)

(73) Assignee: WOOBO TECH CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/475,415

(22) PCT Filed: Jan. 17, 2018

(86) PCT No.: PCT/KR2018/000767
§ 371 (c)(1),
(2) Date: Jul. 2, 2019

(87) PCT Pub. No.: WO2018/135844
PCT Pub. Date: Jul. 26, 2018

(65) Prior Publication Data
US 2019/0344695 A1    Nov. 14, 2019

(30) Foreign Application Priority Data
Jan. 20, 2017 (KR) .................. 10-2017-0009753

(51) Int. Cl.
*B60N 2/841* (2018.01)
*B60N 2/853* (2018.01)
*B60N 2/40* (2006.01)

(52) U.S. Cl.
CPC ............. *B60N 2/841* (2018.02); *B60N 2/853* (2018.02)

(58) Field of Classification Search
CPC ............................................. B60N 2/838–876
See application file for complete search history.

(56) References Cited

U.S. PATENT DOCUMENTS 6,899,395 B2 * 5/2005 Yetukuri .................. B60N 2/85
297/408
6,942,292 B2 * 9/2005 Low ....................... B60N 2/841
297/216.12

(Continued)

FOREIGN PATENT DOCUMENTS

JP    07-011953 U    2/1995
JP    11-262426 A    9/1999

(Continued)

OTHER PUBLICATIONS

International Searching Authority, Korean Intellectual Property Office, International Search Report and Written Opinion of the International Searching Authority, Application No. PCT/KR2018/000767, dated May 14, 2018, 8 pages.

*Primary Examiner* — Syed A Islam
(74) *Attorney, Agent, or Firm* — Sunstein LLP

(57) ABSTRACT

The present invention relates to a headrest moving device including a damper configured to generate a resistance force in a direction opposite to a moving direction when the headrest is moved, wherein, when the headrest is moved, the resistance force is different when the headrest is located at a first position from when the headrest is located at a second position, so that noise can be prevented from being generated and a user can be prevented from recognizing the moving of the headrest as a malfunction when the headrest is moved.

4 Claims, 8 Drawing Sheets

(56) References Cited

U.S. PATENT DOCUMENTS

| | | | |
|---|---|---|---|
| 8,231,177 B2* | 7/2012 | Jammalamadaka | B60N 2/859 297/408 |
| 8,807,653 B2* | 8/2014 | Yetukuri | B60N 2/847 297/408 |
| 8,851,574 B2* | 10/2014 | Yetukuri | B60N 2/844 297/408 |
| 9,145,079 B2* | 9/2015 | Fredriksson | B60N 2/002 |
| 9,168,851 B1* | 10/2015 | Sutter | B60N 2/856 |
| 9,333,884 B2* | 5/2016 | Tachikawa | B60N 2/3013 |
| 9,758,077 B2* | 9/2017 | Yamane | B60N 2/809 |
| 2019/0111819 A1* | 4/2019 | Dillinger | B60N 2/829 |
| 2020/0031263 A1* | 1/2020 | Jeong, | B60N 2/844 |
| 2020/0031264 A1* | 1/2020 | Jiang | B60N 2/853 |

FOREIGN PATENT DOCUMENTS

| | | |
|---|---|---|
| JP | 4654990 B2 | 3/2011 |
| JP | 2016-199211 A | 12/2016 |
| KR | 10-2015-0080045 | 7/2015 |
| KR | 10-2016-0067346 | 6/2016 |

* cited by examiner

[Fig. 1]
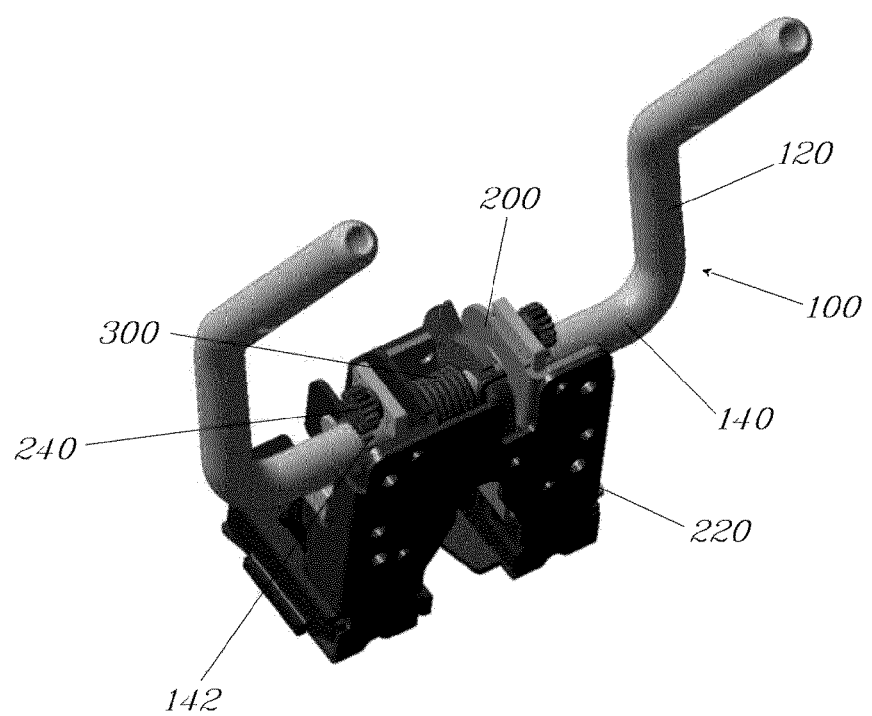

[Fig. 2]
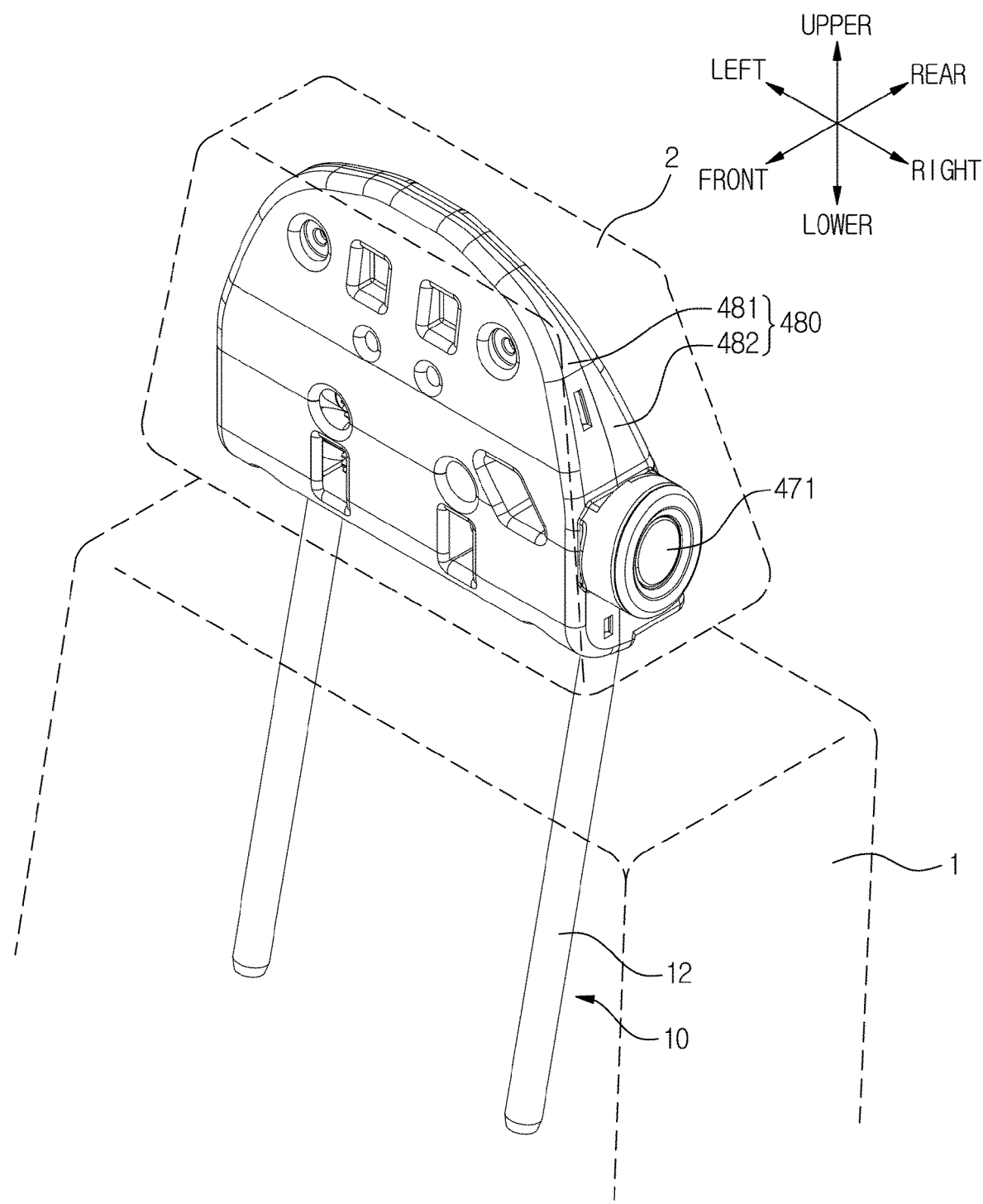

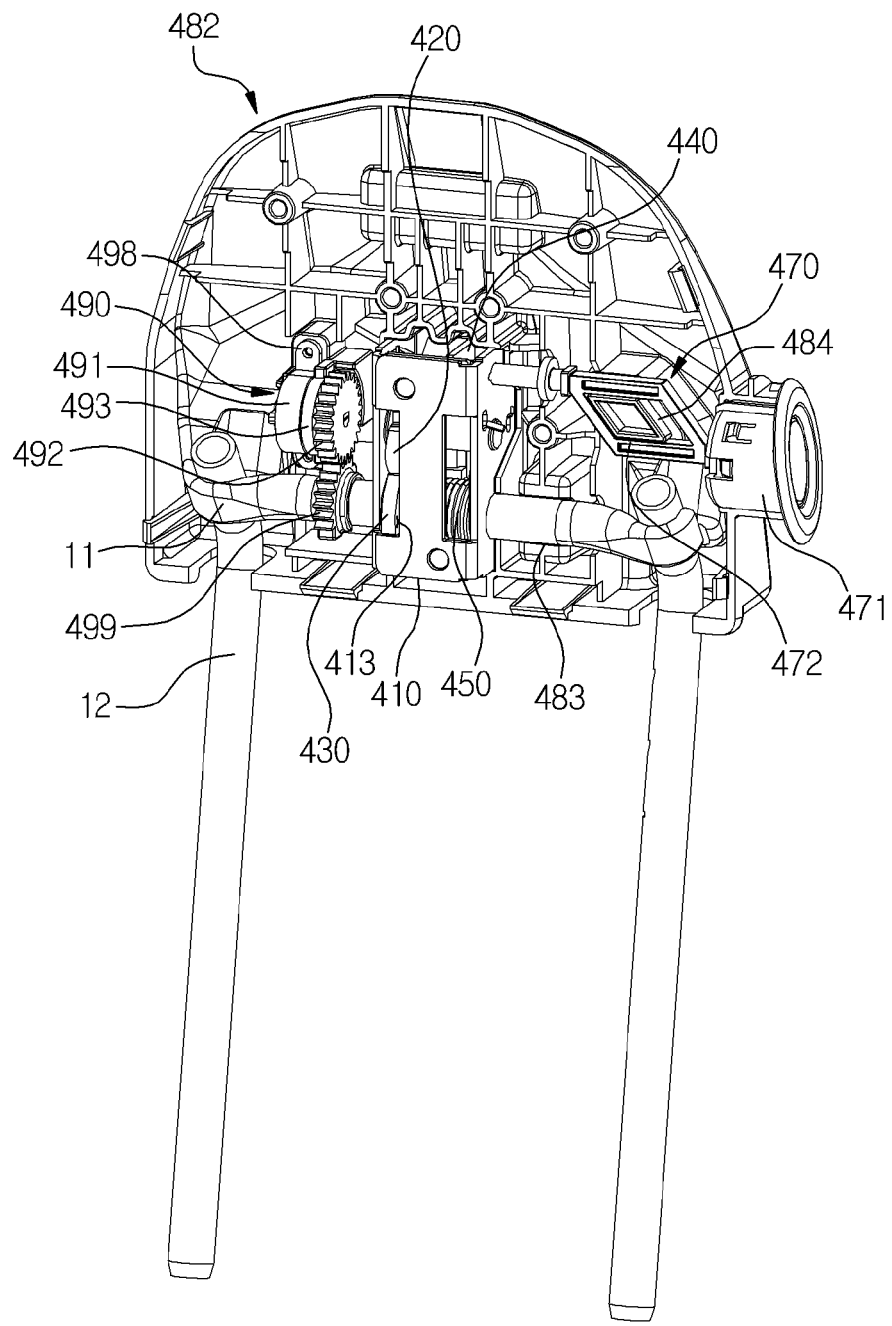
[Fig. 3]

[Fig. 4]
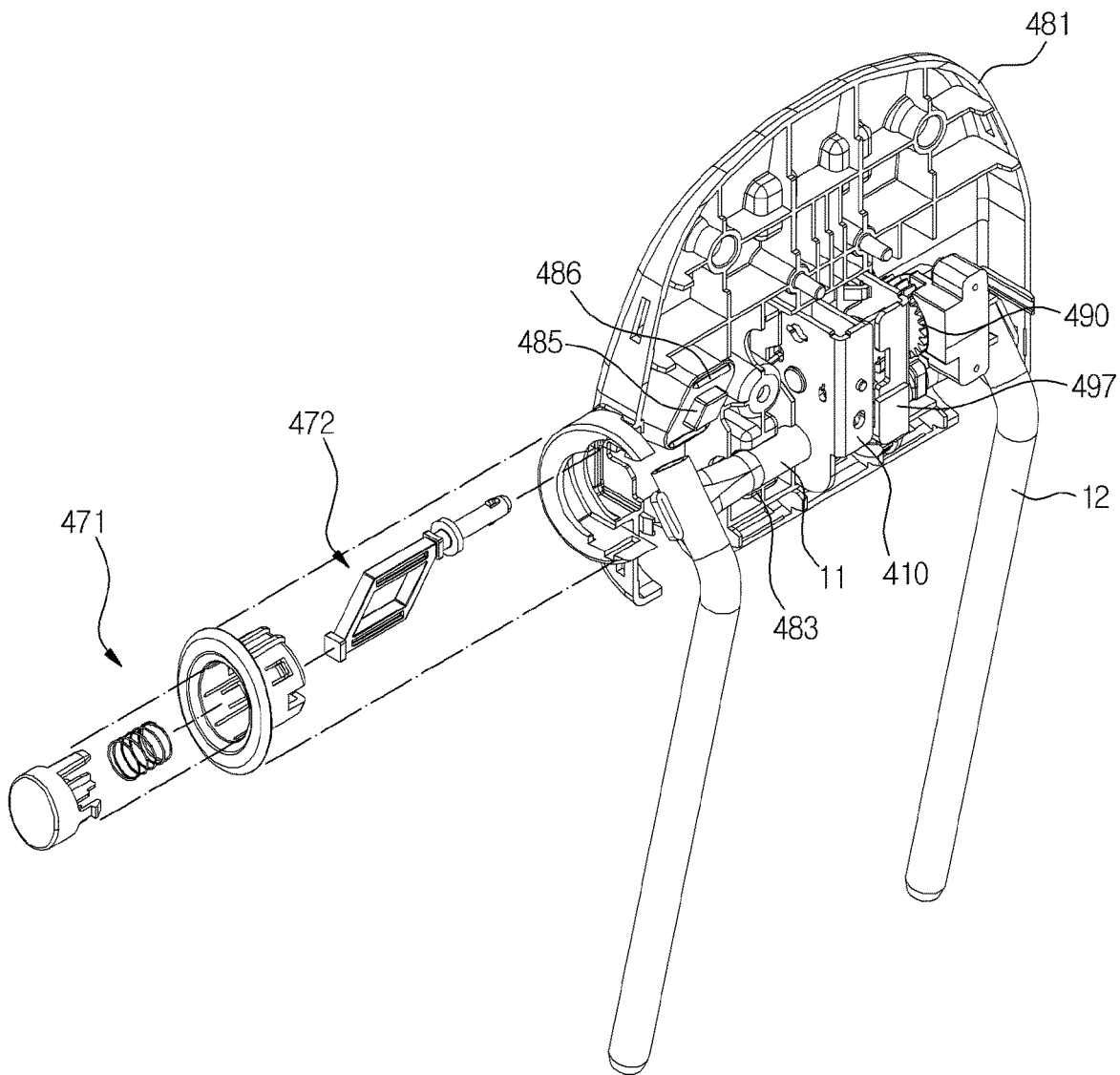

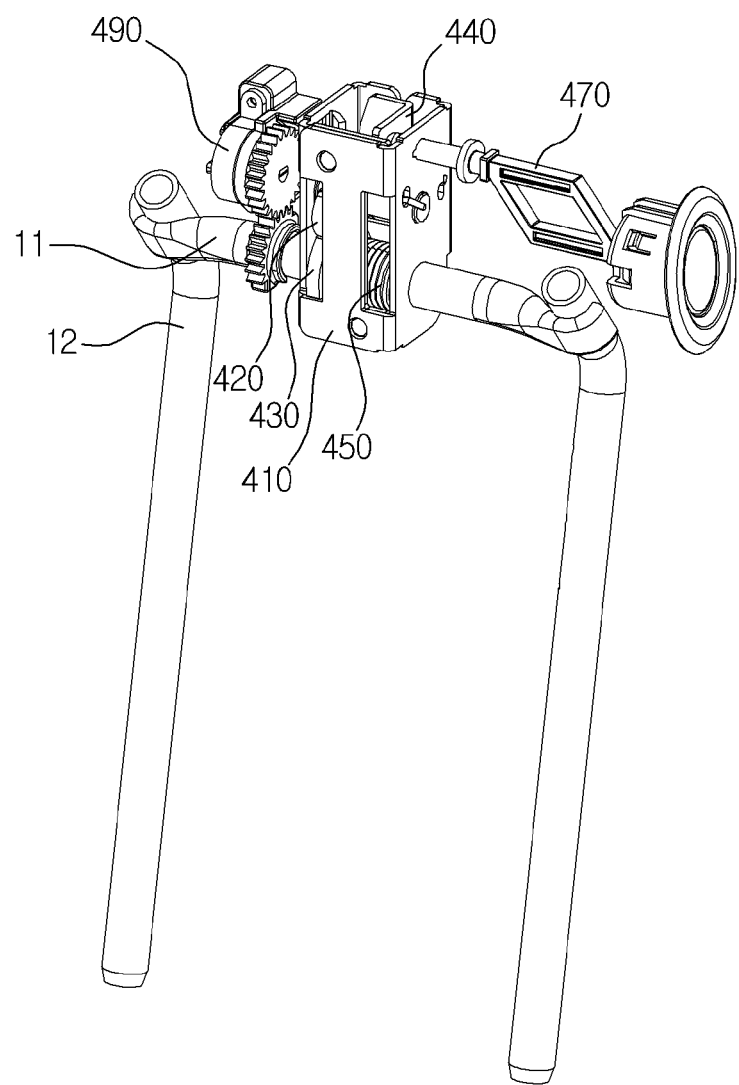
[Fig. 5]

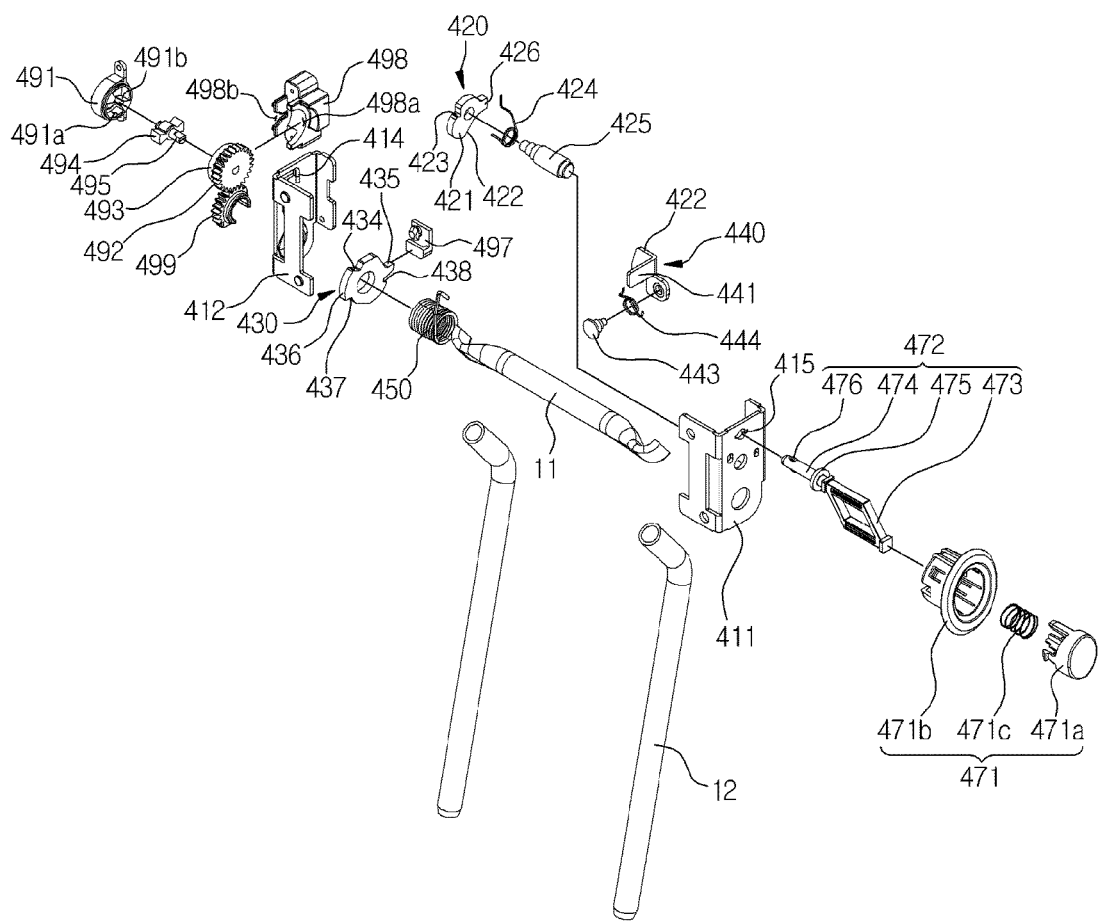
[Fig. 6]

[Fig. 7]
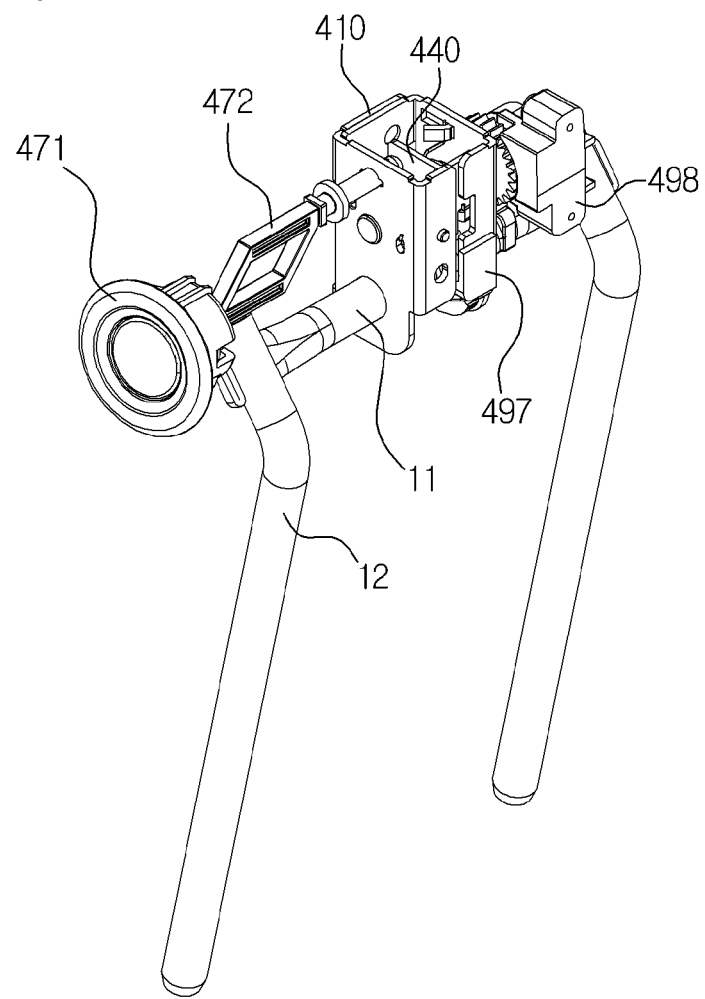
[Fig. 8]
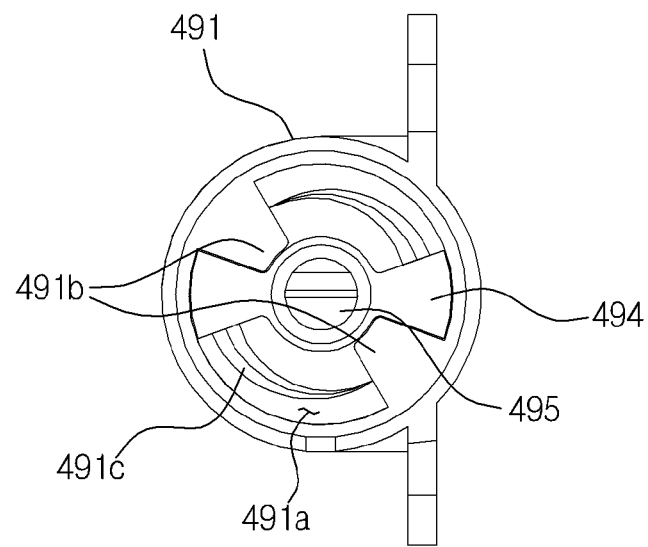

[Fig. 9]
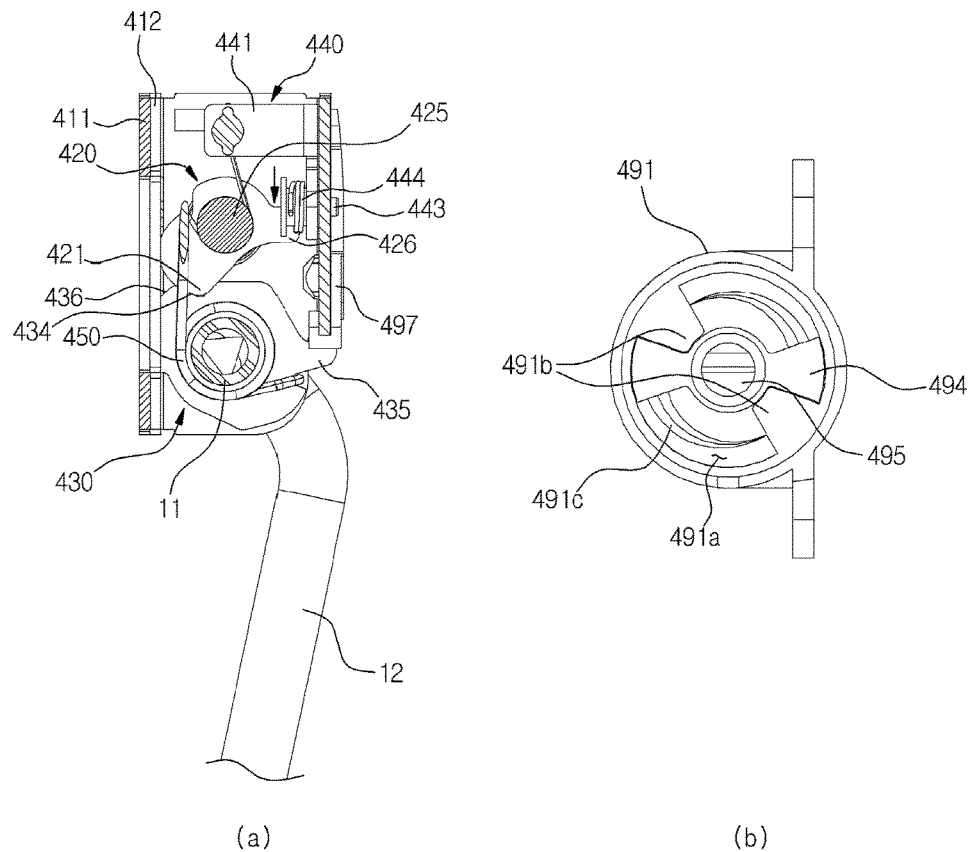
(a)  (b)
[Fig. 10]
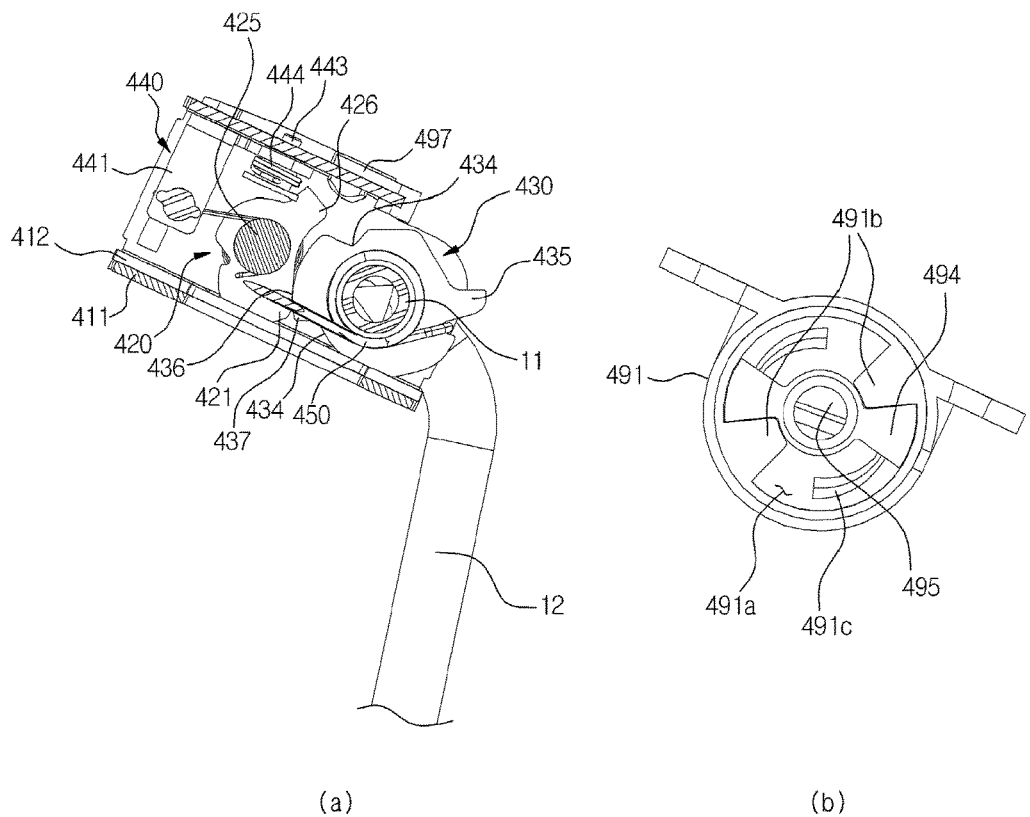
(a)  (b)

HEADREST MOVING DEVICE

TECHNICAL FIELD

The present invention relates to a headrest moving device. More particularly, the present invention relates to a moving device capable of making a headrest slide or fold relative to a seat.

BACKGROUND ART

A folding mechanism is installed at a headrest of a vehicle, and lately, folding mechanisms fold the headrest to secure a view for a passenger or a driver.

The folding mechanism is provided at the top of a seatback so that the headrest is folded toward a front side when necessary to secure a view for a rear seat passenger, or a rear view for the driver.

The folding mechanism is driven by an electric motor using a separate motor, but a spring is generally used for quick driving.

However, when the headrest is folded, there is a problem in that a hitting sound is generated and a folding speed is excessively fast.

In order to resolve such a problem, Korean Patent Application Publication No. 10-2015-0080045 (hereinafter, referred to as Patent Document 1), Japanese Utility Model Publication No. Hei 7-11953, and Japanese Patent Application Publication No. Hei 11-262426 disclose a damper 240 provided between a stay 100 and a headrest.

In Patent Document 1, a stay gear 142 is provided at a rotational shaft of the stay 100, and the damper 240 is a reduction gear type oil damper provided at a bracket 200 and engaged with the stay gear 142.

An undescribed reference numeral 220 denotes a supporter, an undescribed reference numeral 120 denotes a support bar, an undescribed reference numeral 140 denotes a rotational shaft, and an undescribed reference numeral 300 denotes a spring.

However, the conventional damper 240 has a problem in that a dimension thereof needs to be increased when a resistance force is increased.

Further, the conventional damper 240 has the same resistance force at an initial stage of folding and at a latter stage thereof, and thus there is a problem in that a rotational speed of the headrest is slow even at the initial stage of folding such that a user may erroneously recognize a malfunction.

PRIOR-ART DOCUMENTS

Patent Documents

[Patent Document 1] Korean Patent Application Publication No. 10-2015-0080045
[Patent Document 2] Japanese Utility Model Publication No. Hei 7-11953
[Patent Document 3] Japanese Patent Application Publication No. Hei 11-262426

DISCLOSURE OF INVENTION

Technical Problem

A technical objective of the present invention is to provide a headrest moving device capable of maintaining a damper in a compact size and preventing a user from recognizing the operation of the damper as a malfunction while the damper operates.

Solution to Problem

A headrest moving device, which allows a headrest to be movable relative to a seat, according to the present invention comprises: a damper configured to generate a resistance force in a direction opposite to a moving direction when the headrest is moved, wherein, the resistance force when the headrest is located at a first position is different from the resistance force when the headrest is located at a second position when the headrest is moved.

In the headrest moving device according to the present invention, it is characterized in that the headrest moving device further comprises a locking member configured to fix a position of the headrest; and a return spring configured to return the headrest to its original position when the locking member is unlocked, wherein the damper may generate the resistance force in a direction opposite to a direction in which the damper is returned when the locking member is unlocked.

In the headrest moving device according to the present invention, it is characterized in that the resistance force at a latter moving stage is larger than the resistance force an initial moving stage.

In the headrest moving device according to the present invention, it is characterized in that the damper comprises a damper housing having an accommodating portion configured to accommodate fluid and having a rotor provided with a resistor moving in the fluid, and the resistance force may be varied by a recess formed in the damper housing and communicated with the accommodating portion.

In the headrest moving device according to the present invention, it is characterized in that the recess may be formed to have a smaller cross-sectional area toward one side.

In the headrest moving device according to the present invention, it is characterized in that the damper comprises a damper housing having an accommodating portion configured to accommodate fluid and having a rotor provided with a resistor moving in the fluid, a stopper disposed inside the accommodating portion is provided at the damper housing, and the resistor may be hooked to the stopper when the headrest is located at a return position or a locking position.

Advantageous Effects of Invention

According to the headrest moving device of the present invention, there are advantageous effects as follows.

According to the present invention, there is an advantageous effect in that the headrest moving device includes a damper configured to generate a resistance force in a direction opposite to a moving direction when the headrest is moved, wherein, when the headrest is moved, the resistance force is different when the headrest is located at a first position from when the headrest is located at a second position, so that noise can be prevented from being generated and a user can be prevented from recognizing a malfunction when the headrest is moved.

In addition, there is an advantageous effect in that the damper includes the damper housing having an accommodating portion configured to accommodate fluid and having a rotor provided with a resistor moving in the fluid, the resistance force is varied by the recess formed inside the damper housing and communicating with the accommodating portion such that the moving device can become compact in size and can be easily installed inside the headrest. Further, there is an advantageous effect in that the structure of the moving device can be simplified to further improve durability.

Furthermore, there is an advantageous effect in that the stopper disposed inside the accommodating portion is provided at the damper housing, and, when the headrest is located at the return position or the locking position, the resistor is hooked to the stopper such that the headrest can be more stably supported.

Although the present invention has been described with reference to preferred embodiments, it will be understood by a person skilled in the art that various alternations and modifications may be made without departing from the spirit and scope of the present invention as defined by the appended claims.

BRIEF DESCRIPTION OF DRAWINGS

FIG. 1 is a perspective view of a conventional headrest folding mechanism of a vehicle;

FIG. 2 is a perspective view of a headrest moving device according to a preferred embodiment of the present invention;

FIG. 3 is a perspective view illustrating a state in which a front cover of the headrest moving device according to the preferred embodiment of the present invention has been removed;

FIG. 4 is a perspective view illustrating a state in which a rear cover of the headrest moving device according to the preferred embodiment of the present invention has been removed (separated button member);

FIG. 5 is a perspective view illustrating a state in which the front and rear covers of the headrest moving device according to the preferred embodiment of the present invention have been removed;

FIG. 6 is an exploded perspective view of FIG. 5;

FIG. 7 is a rear perspective view of FIG. 5;

FIG. 8 is a side view of a damper of the headrest moving device according to the preferred embodiment of the present invention;

FIG. 9 is a cross-sectional view of the headrest moving device according to the preferred embodiment of the present invention when upright; and FIG. 10 is a cross-sectional view of the headrest moving device according to the preferred embodiment of the present invention when folded.

MODE FOR THE INVENTION

Hereinafter, preferred embodiments of the present invention will be described in detail with reference to the accompanying drawings.

For reference, the same components as those of the prior art will be described with reference to the above-described prior art, and a detailed description thereof will be omitted.

When a portion is referred as being "on" other portion, it may be directly on top of the other portion or may involve another portion therebetween. In contrast, when a portion is referred as being "directly above" other portion, another portion is not interposed therebetween.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Terms indicating relative space such as "below," "above," and the like may be used to more easily describe the relationship to another portion of a portion shown in the drawings. These terms are intended to include alternative meanings or operations of a device in use as well as intended meanings in the drawings. For example, when inverting a device in the drawings, certain portions that are described as being "below" other portions are described as being "above" other portions. Thus, an exemplary term "below" includes both upward and downward directions. The device can be rotated 90 degrees or at another angle, and the term indicating the relative space is interpreted accordingly.

The term "connection" includes not only a direct connection in which no other component is present between connected components but also an indirect connection in which other component is present between the connected components.

As shown in FIGS. 2 to 10, in the present embodiment a moving device allowing a headrest 2 to be movable relative to a seat 1 includes a damper 490 configured to generate a resistance force in a direction opposite to a moving direction when the headrest 2 is moved, wherein, when the headrest 2 is moved, the resistance force when the headrest 2 is located at a first position is different from the resistance force when the headrest 2 is located at a second position.

The moving device is connected to a stay rod 10.

The stay rod 10 includes a horizontal rod 11 disposed in a left-right direction, and a vertical rod 12 vertically disposed at both sides of the horizontal rod 11. In the present embodiment, the horizontal rod 11 and the vertical rods 12 are separately provided, and after the movable device is assembled, both of the sides of the horizontal rod 11 become respectively coupled to the vertical rods 12. For example, the horizontal rod 11 may be coupled to the vertical rods 12 through welding or the like. Alternatively, the horizontal rod 11 and the vertical rods 12 may be integrally formed.

The moving device is disposed inside the seat 1 or the headrest 2. In the present embodiment, the seat 1 is connected to a lower portion of the stay rod 10, and the moving device is disposed inside the headrest 2. Alternatively, when the moving device is disposed inside the seat 1, the headrest 2 is connected to an upper portion of the stay rod 10.

The moving device may be a device configured to fold the headrest 2 forward or backward, or slide the headrest 2 forward or backward. In the present embodiment, the moving device is disposed inside a vehicle to fold the headrest 2 forward.

The moving device includes a locking member configured to fix a position of the headrest 2, and a return spring 450 configured to return the headrest 2 to its original position while unlocking is performed.

The locking member fixes the position of the headrest 2 when the headrest 2 is located at an upright position (i.e., a locking position) and at a folded position (i.e., a return position, and an unlocking position).

The locking member fixes the position of the headrest 2 using a pawl and ratchet principle.

The locking member includes a bracket 410, a first member 420 connected to the bracket 410, and a second member 430 pivotable relative to the bracket 410 and locked to or unlocked from the first member 420.

The locking member is clustered and installed at a central portion of the horizontal rod 11 of the stay rod 10.

The headrest 2 or the seat 1 is connected to the bracket 410. In the present embodiment, the bracket 410 is connected to the headrest 2.

The bracket 410 is connected to the headrest 2 through a cover 480 disposed inside the headrest 2.

The cover 480 is formed of a rigid material such as plastic. The headrest 2 may be formed by covering the cover 480 with a cushion member (not shown).

The cover 480 includes a front cover 481, and a rear cover 482 disposed behind the front cover 481.

Hereinafter, a direction in which the headrest 2 is folded is referred to as a front direction, and an opposite direction is referred to as a rear direction. Also, the front direction refers to a direction toward a head of a person sitting on the seat 1.

The rear cover 482 is detachably installed at the front cover 481.

The rear cover 482 and the front cover 481 are coupled through bolting and hooking.

A hook protrusion is formed to protrude from one of the rear cover 482 and the front cover 481, and a hook hole to which the hook protrusion is fitted is formed at the other of the rear cover 482 and the front cover 481. In the present embodiment, a plurality of hook protrusions are formed at an edge of the rear cover 482, and a plurality of hook holes are formed at the front cover 481.

Bolts (not shown) are respectively engaged at both sides of an upper portion of the cover 480 and one side of an intermediate portion thereof.

Specifically, the bolts are respectively disposed at both sides of an upper portion of the locking member and one side of an intermediate portion thereof.

Inside the rear cover 482 and the front cover 481, a bracket seating recess at which the bracket 410 of the locking member is seated is formed in the middle of the rear cover 482 and front cover 481, and a horizontal rod seating recess 483 at which a right side of the horizontal rod 11 is seated is formed.

Further, a first protrusion 484 is formed inside the rear cover 482 to be inserted into a space between an upper bent portion and a lower bent portion of a bent portion 473, which will be described, and a second protrusion 485 is formed inside the front cover 481 to be inserted into an insertion hole which is formed at the first protrusion 484. These first and second protrusions 484 and 485 facilitate a pre-assembly of the rear cover 482 and the front cover 481 and allow a transferrer 472 to slide smoothly.

Further, guide protrusions 486 are formed inside the rear cover 482 and the front cover 481 to be inserted into elongated holes formed on front and rear surfaces of the bent portion 473 in the left-right direction at upper and lower portions of the first and second protrusions 484 and 485. A guide protrusion 486 is elongated in the left-right direction and is disposed to be spaced apart upward or downward from the first and second protrusions 484 and 485.

Further, a button portion seating recess at which a button portion 471 is seated is formed at right sides of the rear cover 482 and the front cover 481.

An incised portion through which the vertical rod 12 passes is formed at both sides of each of lower portions of the rear cover 482 and the front cover 481. A front-rear length of the incised portion is longer than the front-rear length of the vertical rod 12.

Since the bracket 410 is seated and installed at the bracket seating recess, the bracket 410 is detachable from the cover 480.

An upper portion and a lower portion of the bracket 410 are open and the bracket 410 is formed in a vertically long rectangular parallelepiped shape.

The bracket 410 is pivotably installed at the central portion of the horizontal rod 11.

The bracket 410 includes a first bracket 411, and a second bracket 412 installed at the first bracket 411. As described above, the bracket 410 may be formed with two divided members, but alternatively, the bracket 410 may be formed integrally as one member.

Each of the first bracket 411 and the second bracket 412 includes a front surface, a side surface formed to be bent at a left side or a right side of the front surface, and a rear surface formed to be bent at a rear side of the side surface.

The front face of the first bracket 411 and the front face of the second bracket 412 are formed to overlap. A coupling hole is formed to pass through the first bracket 411 in the front-rear direction, and a coupling protrusion inserted into the coupling hole is formed to protrude forward from the second bracket 412 such that the first bracket 411 and the second bracket 412 are coupled. Alternatively, the first bracket 411 and the second bracket 412 may be coupled by welding a portion of the overlapping portion between the first bracket 411 and the second bracket 412.

A left-right length of each of the rear surface of the first bracket 411 and the rear surface of the second bracket 412 is formed to be shorter than that of the front surface so as to prevent the rear surfaces from overlapping.

A horizontal rod through-hole through which the horizontal rod 11 passes is formed to pass through a side surface of each of the first bracket 411 and the second bracket 412 in the left-right direction.

The first member 420 is connected to the bracket 410.

The first member 420 is pivotably installed inside the bracket 410 by a first member shaft 425 having both sides installed at the side surfaces of the first bracket 411 and the second bracket 412. Thus, the first member 420 is pivotable relative to the bracket 410.

The first member 420 is formed in a plate shape, and is disposed in the front-rear direction.

A first through-hole to which the first member shaft 425 is fitted is formed at the first member 420 in the left-right direction.

A fixing member is installed at a side (left side) of the first member shaft 425. A seating recess at which the fixing member is seated is formed at an outer side of the second bracket 412. The seating recess is formed to be recessed from the outer side to an inner side so that a protrusion is formed from a surface of the second bracket 412 facing the first member 420. The protrusion may minimize friction between the second bracket 412 and the first member 420.

A first stepped portion, a second stepped portion having an outer diameter that is larger than that of the first stepped portion, and a third stepped portion having an outer diameter that is larger than that of the second stepped portion are formed at the left side of the first member shaft 425. The first member 420 is fitted to the second stepped portion, and the second bracket 412 is fitted to the first stepped portion. Therefore, the first member 420 is prevented from being moved in the left-right direction.

Like the first member shaft 425, a stepped portion is formed at a shaft included in the headrest moving device of the present embodiment. Further, a protrusion is formed at the shaft to reduce friction between the shaft and a rotating member when a surface of the shaft faces the rotating member.

A first ratchet 421 is formed to protrude outward from an outer circumferential surface of the first member 420. A front-rear width of the first ratchet 421 is formed to be narrower toward the outside.

A first bent portion 422 is formed to be continuous from the first ratchet 421 on the outer circumferential surface of the first member 420. The first bent portion 422 is formed in a concave arc shape.

Further, a first unlocking hook portion 426 is formed to protrude at the rear side and to be continuous from the first ratchet 421 on the outer circumferential surface of the first member 420.

Furthermore, a spring hook portion 423 is formed on the outer circumferential surface of the first member 420 in a recessed shape to which one end of a first member spring 424 is hooked. The first member spring 424 returns the first member 420 to its original position. In the present embodiment, the first member spring 424 returns the first member 420 to a locking position. The first member spring 424 is provided with a coil spring. The first member spring 424 is fitted to the third stepped portion of the first member shaft 425. Thus, the first member spring 424 is disposed on the right side of the first member 420. The other end of the first member spring 424 is hooked to a second member spring hook portion 414 formed at the second bracket 412. The second member spring hook portion 414 is formed by incising a portion of the second bracket 412 to bend the incised portion so that it protrudes toward an inner side of the second bracket 412.

When viewed from the right side, the first bent portion 422, the first ratchet 421, the spring hook portion 423, and the first unlocking hook portion 426 are sequentially disposed along a clockwise direction.

The second member 430 is pivotable relative to the bracket 410 and is locked to or unlocked from the first member 420.

The second member 430 is also formed in a plate shape which is disposed in the front-rear direction.

The second member 430 is disposed below the first member 420.

A through-hole through which the horizontal rod 11 passes is formed at the second member 430 in the left-right direction, and is fixed to the horizontal rod 11 through welding or the like to be pivotable relative to the bracket 410.

A protrusion is formed on a surface of the second bracket 412, which faces the second member 430. The protrusion may minimize friction between the second bracket 412 and the second member 430.

A second ratchet 434 is formed at the second member 430 to be engaged with the first ratchet 421.

The second ratchet 434 is formed in a recessed shape into which the first ratchet 421 is inserted.

When the first ratchet 421 and the second ratchet 434 are engaged, a locking state is activated to maintain an unfolded state (i.e., an upright state, and when the engagement is released, the locking state is switched to an unlocking state to maintain a folded state).

A second bent portion 436 is formed to be convex and continuous from the second ratchet 434 on the outer circumferential surface of the second member 430. The second bent portion 436 is formed in an arc shape. The second bent portion 436 is brought into contact with the first bent portion 422 when folded.

A stopper protrusion 437 is formed to be continuous from the second bent portion 436 and to protrude outward from the outer circumference of the second member 430. When the first ratchet 421 and the second ratchet 434 are engaged (in the unfolded state), the stopper protrusion 437 is inserted into the incised portion 413 to be hooked to the bracket 410. Therefore, when the user moves the headrest 2 from the folded state to the unfolded state, the headrest 2 is no longer rotated to the rear side when in the unfolded position, such that the moving device is prevented from being damaged. Further, when the headrest 2 is in the unfolded state, a force supporting a head of a passenger may be distributed to the first and second ratchets 421 and 434 and the stopper protrusion 437 to stably support the head, and durability may simultaneously be improved.

A bumper contact portion 435 is formed to protrude from a rear side of the second member 430 to be brought into contact with a bumper 497 which is detachably installed at a rear surface of the second bracket 412. When the user moves the headrest 2 from the folded state to the unfolded state and thus the headrest 2 is in the unfolded position, the bumper contact portion 435 may be brought into contact with the bumper 497 such that the moving device may be protected without generating a hitting sound.

When viewed from the right side, the second ratchet 434, the second bent portion 436, the stopper protrusion 437, and the bumper contact portion 435 are sequentially disposed in a counterclockwise direction.

A return spring 450 is disposed inside the bracket 410 to be located at a right side of the second member 430.

The return spring 450 is provided with a coil spring.

A central portion (i.e., a coil portion) of the return spring 450 is fitted to the horizontal rod 11. One end of the return spring 450 is hooked to a return spring hook portion 438 formed at the second member 430, and the other end thereof is hooked to the first bracket 411. The return spring 450 allows the bracket 410 to be pivotable (movable) relative to the stay rod 10.

When the first member 420 and the second member 430 are unlocked, the return spring 450 rotates the first member 420 and the bracket 410 to the unfolded position relative to the second member 430.

An unlocking portion 440 is installed inside the bracket 410 to unlock the first member 420 and the second member 430.

The unlocking portion 440 is pivotably installed on the rear surface of the first bracket 411 through an unlocking portion shaft 443.

The unlocking portion 440 is formed in a plate shape and is disposed in the left-right direction.

The unlocking portion shaft 443 is disposed in the front-rear direction.

The unlocking portion 440 is disposed behind the first member 420.

A second unlocking hook portion 442 is formed to protrude toward a left side at the unlocking portion 440. The second unlocking hook portion 442 is hooked to the first unlocking hook portion 426 of the first member 420. The second unlocking hook portion 442 is disposed at a left side of the unlocking portion shaft 443.

A pressing portion 441 is formed to be bent forward at an upper left portion of the unlocking portion 440. The pressing portion 441 is disposed in the front-rear direction.

The pressing portion 441 is disposed above the second unlocking hook portion 442.

An unlocking portion spring 444 is provided at the unlocking portion 440 to return the unlocking portion 440 to its original position when an external force is removed. The unlocking portion spring 444 is provided with a coil spring. A central portion (i.e., a coil portion) of the unlocking portion spring 444 is fitted to the unlocking portion shaft 443 and is disposed in front of the unlocking portion 440. One end of the unlocking portion spring 444 is hooked to the unlocking portion 440 and the other end thereof is hooked to the first bracket 411 of the bracket 410. A first fitting recess to which one end of the unlocking portion spring 444 is fitted is formed at the unlocking portion 440 to dispose the unlocking portion spring 444 between the second unlocking hook portion 442 and the pressing portion 441. A second fitting hole to which the other end of the unlocking portion spring 444 is fitted is formed to pass through the first bracket 411 in the left-right direction.

Further, a protrusion protruding in the rear side around a third through-hole to which the unlocking portion shaft 443 is fitted is formed at a rear surface of the unlocking portion 440. The protrusion may minimize friction between the unlocking portion 440 and the bracket 410.

In the present embodiment, the unlocking portion 440 is operated by a button member 470. Alternatively, the unlocking portion 440 may be operated by a wire, a motor (e.g., an actuator), or the like.

The button member 470 is disposed at the right side of the bracket 410.

The button member 470 includes a button portion 471 having a button 471a, and a transferrer 472 configured to deliver a force pressing on the button 471a to the unlocking portion 440.

The button portion 471 is disposed at a side of the headrest 2.

The button portion 471 includes the button 471a, a bezel 471b in which the button 471a is slidably fitted in the left-right direction, and a button spring 471c configured to return the button 471a.

The button 471a may be disposed to be exposed through a side surface of the headrest 2. The button 471a and the bezel 471b are engaged through a hook formed at the button 471a, and an elongated hole is formed at the bezel 471b in the left-right direction to allow the hook to slide.

The button spring 471c is disposed between the button 471a and the bezel 471b.

The button 471a and the transferrer 472 are detachably provided. Alternatively, the button 471a and the transferrer 472 may be provided to be connected to each other.

The transferrer 472 includes a bent portion 473 formed to be bent, and a rod 474 formed at one side of the bent portion 473 in a linear shape. The transferrer 472 is disposed in the left-right direction.

The bent portion 473 includes an upper bent portion and a lower bent portion formed below the upper bent portion, and is formed to be bent in approximately a parallelogram shape. By virtue of the bent portion 473, even when a height of the button 471a is different from that of the unlocking portion 440, a force may be smoothly delivered.

A flange 475 is formed at one side of the rod 474, and a rod hook protrusion 476 is formed at the other side thereof. The rod hook protrusion 476 is formed at an upper portion and a lower portion of the rod 474.

A rod through-hole 415 through which the rod 474 passes is formed at the side surface of the first bracket 411 of the bracket 410 in the left-right direction. A protrusion through-hole is formed in a front side and/or a rear side of the rod through-hole 415 to communicate with the rod through-hole 415. When assembled, the rod hook protrusion 476 is inserted into the bracket 410 through the protrusion through-hole. After the assembly is completed, the rod hook protrusion 476 is vertically disposed by a weight of the transferrer 472. Therefore, after the assembly is completed, the rod hook protrusion 476 is disposed to be crossed with the protrusion through-hole such that the rod hook protrusion 476 is prevented from escaping through the protrusion through-hole.

The flange 475 is disposed outside the bracket 410 and the rod hook protrusion 476 is disposed inside the bracket 410. Further, a transferrer return spring (not shown) may be further provided between the flange 475 and a second bracket plate to return the transferrer 472 to its original position.

A damper 490 is disposed between the headrest 2 and the seat 1 and generates a resistance force in a direction opposite to a moving direction of the headrest 2 when the headrest 2 is moved relative to the seat 1.

When the headrest 2 is moved, the resistance force is different when the headrest 2 is located at a first position from when the headrest 2 is located at a second position (that is, a different position from the first position).

The damper 490 is disposed at a left outer side or a right outer side of the bracket 410. Specifically, the damper 490 is disposed between the two vertical rods 12.

The damper 490 generates a resistance force in a direction opposite to a direction in which the locking member returns to its original position when unlocked. That is, when viewed from the right side, the damper 490 generates a resistance force in a clockwise direction when the locking member is unlocked.

The damper 490 may employ various type dampers such as a rotary type damper, a piston type damper, and the like. In the present embodiment, the damper 490 is provided with a rotary type damper. Specifically, the damper 490 of the present embodiment is configured with a reduction gear type oil damper as in the prior art.

The damper 490 applies a resistance force to the headrest 2 which is pivoted (folded) relative to the seat 1.

The damper 490 includes a damper housing 491 having an accommodating portion 491a in which fluid (oil) is accommodated, and a rotor provided with a resistor 494 moving (rotating) in the fluid.

One side of the damper 490 is connected to the seat 1 and the other side thereof is connected to the headrest 2.

The one side of damper 490 is connected to the seat 1 by a first gear 499 and a second gear 492 engaged with the first gear 499.

The first gear 499 is formed on the outer circumferential surface of the horizontal rod 11. The first gear 499 may be separately formed in an arc shape and may be fixed to the outer circumferential surface of the horizontal rod 11 through welding or the like.

The second gear 492 is axially coupled to a shaft 495 of the rotor.

The damper housing 491 is formed in a cylindrical shape.

The damper housing 491 is connected to the headrest 2 through a damper bracket 498. The damper housing 491 is detachably installed at the damper bracket 498 using bolts or the like. Thus, the damper housing 491 is rotated as the headrest 2 is rotated.

The damper bracket 498 is disposed between the front cover 481 and the rear cover 482 to be installed inside the cover 480.

A damper seating recess 498a at which a rear side of the damper housing 491 is seated is formed at the damper bracket 498. A front side and a right side of the damper seating recess 498a are formed to be open.

A protrusion insertion recess 498b into which a rotation prevention protrusion formed at a left side of the damper housing 491 is inserted is formed to pass through a left side of the damper bracket 498 in the left-right direction. A front side of the protrusion insertion recess 498b is formed to be open and to communicate with the damper seating recess 498a.

The accommodating portion 491a is formed at a right side surface of the damper housing 491, and a right side of the accommodating portion 491a is formed to be open.

The rotor includes a resistor 494 formed in a wing shape, and a shaft 495 connected to a central portion of the resistor 494.

The resistor 494 is disposed inside the accommodating portion 491a.

The resistor 494 includes two wings. Each of the two wings is formed in a plate shape, and has a fan shape having a wider width toward the outside.

Each wing of the resistor 494 is rotated relative to the damper housing 491 as the headrest 2 is rotated to pressurize fluid disposed inside the accommodating portion 491a such that the fluid at one side of each wing moves toward the other side thereof. A value of the resistance force may be determined according to a shape of a path through which the fluid moves.

A stopper 491b disposed inside the accommodating portion 491a is provided at the damper housing 491. Two stoppers 491b are provided and spaced apart from each other in a circumferential direction. The stopper 491b is formed in a fan shape having a wider width toward the outside. The stopper 491b is integrally formed with the damper housing 491. The stopper 491b divides the accommodating portion 491a into two fan-shaped spaces. The wings of the resistor 494 are disposed in the two spaces of the accommodating portion 491a, respectively. Further, the stopper 491b is disposed to hook the resistor 494 when the headrest 2 is located at a return position (i.e., the unlocking position) or the locking position.

When the resistor 494 is rotated relative to the damper housing 491, fluid is disposed inside the damper housing 491 to move through a recess 491c communicating with the accommodating portion 491a. The recess 491c is integrally formed with the damper housing 491.

The recess 491c is formed at an inner wall of the damper housing 491 in an arc shape along a direction in which the wing moves with respect to the damper housing 491 on surfaces facing the wings of the resistor 494. A right side of the recess 491c is formed to be open. The recess 491c is formed in the two spaces.

Since the wings are formed to prevent a cross-sectional area or a cross-sectional shape of the recess 491c from being constant along a direction in which the wings move relative to the damper housing 491, the resistance force is varied. As described above, the resistance force may be increased or decreased by the recess 491c formed in the damper housing 491 such that the resistance force can be easily controlled and increased while maintaining the moving device in a compact size, and also a structure can be simplified to improve durability and prevent variation of the resistance force even when an external temperature varies.

In the present embodiment, the recess 491c is formed to have a constant sectional shape and sectional area that becomes smaller toward one side (i.e., one end of the one side). The cross-sectional area of the recess 491c is formed to become smaller toward the counterclockwise direction.

Therefore, the resistance force at a latter moving stage is larger than the resistance force an initial moving stage.

When the user presses the button 471a to fold the headrest 2, a cross-sectional area of a flow path through which the fluid in the recess 491c moves is large at the initial moving stage so that resistance is small and a rotational speed of the headrest 2 is fast, and then the cross-sectional area becomes gradually smaller so that the resistance is large and the rotation speed of the headrest 2 is slowed down.

A starting end (a position of maximum cross-sectional area) of the recess 491c may be spaced apart from the stopper 491b and a final end (a position of minimum cross-sectional area) of the recess 491c may be connected to the stopper 491b. Alternatively, the starting end of the recess 491c may be formed to be connected to the stopper 491b.

The recess 491c is formed to have a smaller width toward a direction opposite to the direction in which the resistor 494 faces the wing. That is, the cross-sectional shape of the recess 491c in the left-right direction is formed to be a triangle.

The damper 490 further includes a damper cover 493 configured to cover the accommodating portion 491a. The damper cover 493 is formed in a circular plate shape, and a shaft through-hole through which the shaft 495 of the rotor passes is formed at a central portion of the damper cover 493 in the left-right direction. A sealing member such as an O-ring may be further provided between the damper cover 493 and the shaft 495 of the rotor. A right side of the shaft 495 of the rotor is exposed to the outside of the damper housing 491. The second gear 492 is axially coupled to the exposed portion of the shaft 495 of the rotor.

Hereinafter, an operation of the present embodiment having the above-described configuration will be described.

<Unfolded State (Locking State)>

As shown in FIG. 9, the first ratchet 421 is engaged with the second ratchet 434, and the headrest 2 is maintained in an upright state on the seat 1. In this state, the wings of the rotor are supported by the stopper 491b.

<Folded State (Unlocking State)>

When the user presses the button 471a, the transferrer 472 is moved in the left-right direction by the button 471a. As a result, the rod 474 presses on the pressing portion 441. Thus, the unlocking portion 440 is rotated in the counterclockwise direction. As the unlocking portion 440 is rotated, the second unlocking hook portion 442 is also rotated in the counterclockwise direction. The first unlocking hook portion 426 of the first member 420 is hooked to the second unlocking hook portion 442 which is rotating, so that the first member 420 is rotated in the clockwise direction when the moving device is viewed from the right side. Consequently, the first ratchet 421 escapes from the second ratchet 434 to unlock. The first member 420 and the headrest 2 are rotated about the horizontal rod 11 by an elastic force of the return spring 450 and then are folded forward.

Thus, when the headrest 2 returns, the second gear 492 is engaged with the first gear 499 to be rotated in the counterclockwise direction. As the second gear 492 is rotated, the rotor also rotates. Further, the damper housing 491 is also rotated relative to the rotor.

Accordingly, the fluid inside the accommodating portion 491a moves through the recess 491c from one side of the wing of the rotor to the other side of the wing thereof. Since the cross-sectional area of the recess 491c is formed to become smaller, the resistance force is not large at the initial moving stage of the headrest 2, and becomes larger toward the latter moving stage.

As shown in FIG. 10, one surface of the second member 430 is hooked to the second bracket 412 such that folding is completed. When the folding is completed, the second bent portion 436 and the first bent portion 422 are in contact with each other. When the folding is completed, the wings of the rotor are supported by another stopper 491b.

Meanwhile, when the user removes the force pressing on the button 471a, the button 471a and the transferrer 472 return to their original positions.

The process of unfolding the folded headrest 2 is as follows.

When the headrest 2 is lifted and pushed backward, the first member 420 and the headrest 2 are rotated in a clockwise direction. Further, the first member 420 is rotated in the counterclockwise direction by an elastic force of the first member spring 424. Consequently, the first ratchet 421 is engaged with the second ratchet 434 such that the unfolded state of headrest 2 is maintained. Further, when the first ratchet 421 is engaged with the second ratchet 434, the stopper protrusion 437 of the second member 430 is hooked to the bracket 410 such that the headrest 2 is stopped even when the user further pushes the headrest 2.

When the headrest 2 is unfolded, the cross-sectional area of the recess 491c becomes larger such that the resistance force becomes smaller.

Although description has been given with reference to preferred embodiments of the present invention, one of ordinary skill in the art should understand that the present invention can be modified and changed in various ways within the scope not departing from the spirit and the range of the present invention described in the claims below.

DESCRIPTION OF SYMBOLS

10: stay rod, 11: horizontal rod
12: vertical rod, 410: bracket
411: first bracket, 412: second bracket
413: incised portion
414: second member spring hook portion
415: rod through-hole
420: first member, 421: first ratchet
422: first bent portion, 423: spring hook portion
424: first member spring
425: first member shaft
426: first unlocking hook portion
430: second member, 434: second ratchet
435: bumper contact portion
436: second bent portion
437: stopper protrusion
438: return spring hook portion
440: unlocking portion
441: pressing portion
442: second unlocking hook portion
443: unlocking portion shaft
444: unlocking portion spring
450: return spring
470: button member, 471: button portion
471a: button, 471b: bezel
471c: button spring, 472: transferrer
473: bent portion, 474: rod
475: flange, 476: rod hook protrusion
480: cover, 481: front cover
482: rear cover, 483: horizontal rod seating recess
484: first protrusion, 485: second protrusion
486: guide protrusion, 490: damper
491: damper housing, 491a: accommodating portion
491b: stopper, 491c: recess
492: second gear, 493: damper cover
494: resistor, 495: shaft
497: bumper, 498: damper bracket
498a: damper seating recess
498b: protrusion insertion recess
499: first gear

The invention claimed is:

1. A moving device configured to allow a headrest to be movable relative to a seat, comprising:
 a damper configured to generate a resistance force in a direction opposite to a moving direction when the headrest is moved,
 wherein, the resistance force when the headrest is located at a first position is different from the resistance force when the headrest is located at a second position when the headrest is moved,
 wherein the damper includes a damper housing having an accommodating portion configured to accommodate fluid and having a rotor provided with a resistor moving in the fluid, and
 the resistance force is varied by a recess formed in the damper housing and communicated with the accommodating portion.

2. The moving device of claim 1,
 wherein the resistance force at a latter moving stage is larger than the resistance force an initial moving stage.

3. The moving device of claim 1,
 wherein the recess is formed to have a smaller cross-sectional area toward one side.

4. The moving device of claim 1,
 wherein a stopper disposed inside the accommodating portion is provided at the damper housing, and
 wherein the resistor is hooked to the stopper when the headrest is located at a return position or a locking position.

* * * * *